No. 846,642. PATENTED MAR. 12, 1907.
E. L. ANDERSON.
PROCESS OF REDUCING METALLIC SULFIDS.
APPLICATION FILED DEC. 26, 1905.

Inventor
Edward L. Anderson

UNITED STATES PATENT OFFICE.

EDWARD L. ANDERSON, OF ST. LOUIS, MISSOURI, ASSIGNOR, BY DIRECT AND MESNE ASSIGNMENTS, OF ONE-HALF TO HIMSELF AND HARVEY ATCHISSON, OF ST. LOUIS, MISSOURI, AND ONE-HALF TO JOHN H. MILLER AND CHALON G. CLOUD, OF McLEANSBORO, ILLINOIS.

PROCESS OF REDUCING METALLIC SULFIDS.

No. 846,642.   Specification of Letters Patent.   Patented March 12, 1907.

Application filed December 26, 1905. Serial No. 293,334.

*To all whom it may concern:*

Be it known that I, EDWARD L. ANDERSON, a citizen of the United States, residing at St. Louis, State of Missouri, have invented certain new and useful Improvements in Processes of Reducing Metallic Sulfids and other Compounds, of which the following is a full, clear, and exact description, reference being had to the accompanying drawings, forming a part hereof.

My invention has relation to improvements in processes of reducing metallic sulfid ores electrolytically; and it consists in the novel series of steps more fully set forth in the specification and pointed out in the claims.

Figure 1:
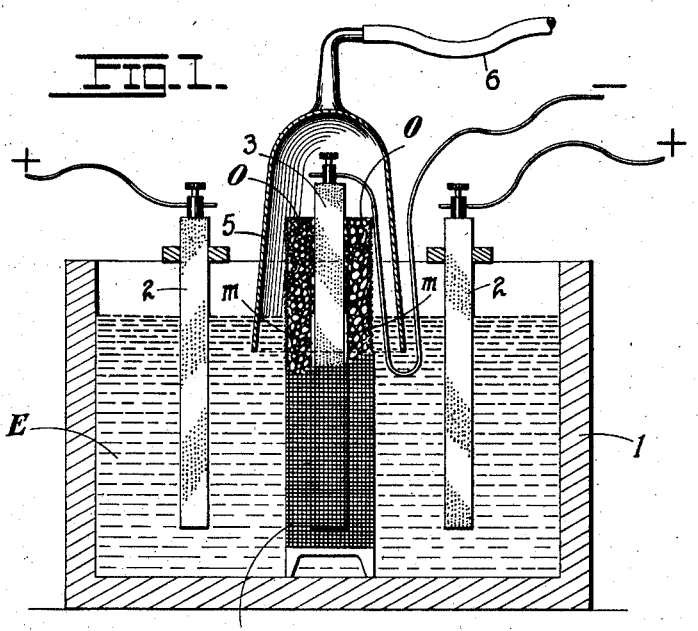
Figure 2:
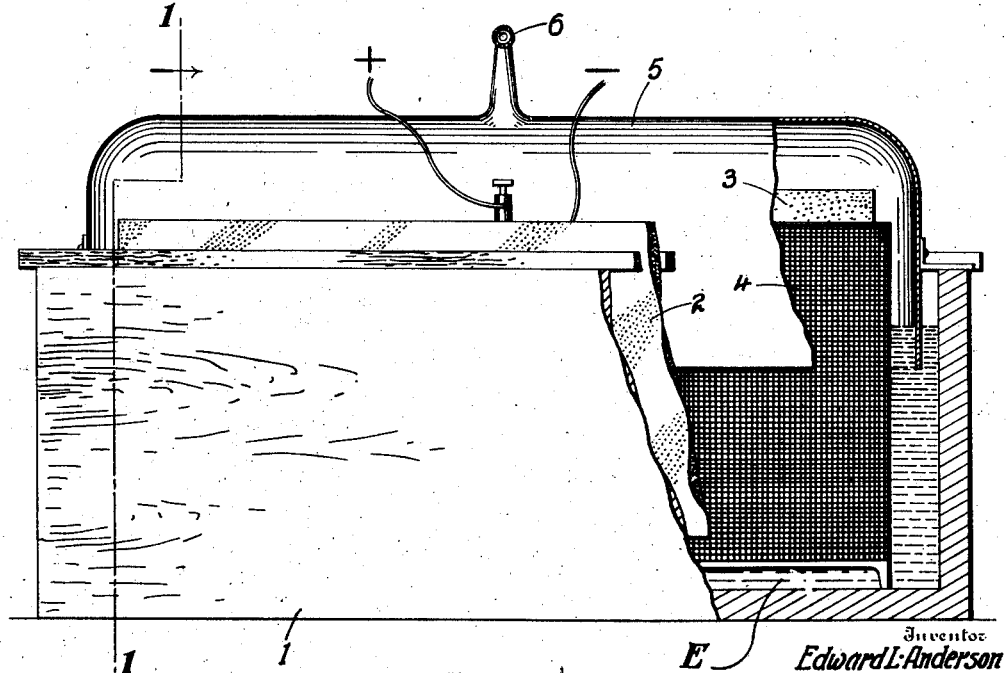

In the drawings, Figure 1 is a vertical transverse section on line 1 1 of Fig. 2 of the reduction-tank, and Fig. 2 is a part side elevation and part section of the same.

The object of my invention is to effect the electrolytic reduction of metallic sulfids, and notably sulfid ores of zinc, copper, lead, and other metals, by the action of nascent hydrogen (disengaged from the electrolyte) upon the sulfur constituent of the ore, such action resulting in the formation of hydrogen-sulfid gas, leaving the metal constituent free to be deposited on one of the electrodes, (the cathode.) The hydrogen-sulfid gas may be conducted to any suitable source of consumption, but preferably to a gas-engine in which it may be utilized as a fuel to generate the motive power for such engine. The engine in turn can operate an electric generator to furnish the current for effecting the decomposition of the electrolyte employed in my process. In this manner the reduction of the ore can be accomplished at a minimum cost, eliminating the cost of coal or other fuel as a source of power.

A further object is to obtain the metal in an almost chemically-pure state, it being possible under my process to effect the successive recovery of several metals from solution in a common electrolyte by the careful adjustment and regulation of the current density and working voltage according to the character and number of metals treated.

A further object is to secure the deposition of the recovered metal in a compact form by treating the same in the presence of an electrolyte in which the ore is insoluble and which does not initially contain the metal in solution, the solution of the metal being merely an incident of the general process and taking place only on the verge of actual precipitation or deposition.

The process can be carried on in any suitable apparatus, and in the description of the invention I will describe one form of apparatus which may be varied or altered according to the requirements of the plant and according to the uses to be made of the by-products.

In detail the invention may be described as follows:

Referring to the drawings, 1 represents a wooden reduction-tank of suitable shape and dimensions in which is contained an aqueous solution of the electrolyte E. Into this are inserted anode electrodes 2 2 of carbon or graphite and a primary cathode electrode 3 of carbon or graphite, the latter electrode being surrounded by a wire basket 4, suitably glazed or enameled so as not to be affected by the electrolyte E. Around the cathode E and within the basket 4 is placed the necessary quantity of the ore O, preferably ground to about fifteen or twenty mesh, the ore serving as an additional or secondary and decomposable cathode element in conjunction with the primary cathode 3. Superposed over the cathode is a vertically-adjustable bell or hood 5, likewise having a protecting coating of enamel, a flexible pipe 6 leading from the top of the hood for conducting the gas ($H_2S$) disengaged at the cathode to any suitable point of consumption. The electrolyte employed in my process is (preferably) silico-hydro-fluoric (hydrofluosilicic) acid, ($H_2SiF_6$,) and as an illustration I will take zinc sulfid (ZnS) as the ore to be treated.

The current passes, of course, from the anodes to the cathode, and, so far as the water is concerned, oxygen will be liberated at the anodes and hydrogen at the cathode. The nascent hydrogen immediately attacks the sulfur of the ore, forming sulfureted-hydrogen gas, which passes up through the bell or hood 5 and out through the pipe 6 to a suitable gas-engine, as stated above, or to any available point of consumption. The metal or zinc $m$ being now liberated from the sulfur element becomes deposited on the opposite faces of the cathode, from which it may be stripped or peeled off from time to time. To be more explicit as to the chemical reactions which take place at the moment of liberation of the hydrogen and its combination with the sulfur of the ore, it may be stated that the zinc or metal element thus freed and being out of electrical connection with the cathode at once goes into solution in the acid electrolyte, forming $ZnSiF_6$, the zinc taking the place of the hydrogen of the acid. It is from this zinc solution that the metal is at once deposited on the cathode, the impressed difference of potential preventing the metal thus in contact with the cathode from dissolving, the said solution (a salt of zinc) being an incident of my process, which, as above stated, contemplates the employment of an electrolyte in which the metal is not initially held in solution. The deposition of metals from solutions of their salts through which an electric current is passed is well known, and my invention should in no wise be confounded with this well-known process. In my process the ore is not initially dissolved in the electrolyte, but acts as a complementary or supplemental cathode or conductor to the cathode 3, being in position to be attacked by the nascent hydrogen as fast as it is disengaged, thereby causing the electrolyte to effect an immediate solution of the metal element free at the cathode the moment the sulfur element combines with the hydrogen, from which electrolytic solution the metal is at once deposited on the cathode, as already indicated.

The essential requisites of my process are, first, that the ore shall be insoluble in the electrolyte; second, that the metal base of the ore shall be soluble in the electrolyte after its reduction by the current; third, that the electrodes shall be unaffected by the electrolyte; fourth, that the acid portion of the electrolyte shall be unaffected by a current capable of reducing the ore, the strength of the current used being insufficient to decompose the hydrofluosilicic acid employed in the process, and, fifth, that the salt resulting from the solution of the metal in the electrolyte at the moment of the ore's reduction (by the nascent hydrogen) shall be instantly acted upon by the current which, following the line of least resistance toward the cathode 3, (a carbon or graphite cathode being a better conductor than a cathode of ore,) at once splits up the salt, permitting the metal to deposit on the cathode instead of clinging to the undecomposed ore. Besides, the deposit of the metal on the cathode results in the formation of a compact layer and not in a spongy mass, as happens in processes in which the ore is diffused throughout the electrolyte. By localizing the ore at the cathode the deposition of the metal takes place immediately at the point of decomposition of the salt solution formed by the metal and the acid electrolyte at the moment of the formation of the sulfureted hydrogen.

Where the ore may contain more than one metal base and where the several metals are liable to pass into solution as a result of their combination with the electrolyte, advantage is taken of the fact that currents of different intensities are required to decompose different salt solutions, so that when one metal has been deposited on the cathode with one current the deposit is removed and the cathode replaced in the electrolyte, when upon changing or increasing the current the second metal can be recovered, and so on.

Of course the primary object of the invention is to reduce metallic sulfid ores, since the sulfureted hydrogen can be used to operate the engine which runs the dynamo by which the current is generated; but obviously the process may be applied to the reduction of metallic oxids and other compounds insoluble in the electrolyte prior to the passage of the current therethrough, but having a base or metal capable of forming a salt solution with the electrolyte after the current is once started and the nascent hydrogen is evolved at the cathode, and where the original sulfid contains oxids or carbonates of other metals initially soluble in the electrolyte the metals may be recovered successively by carefully regulating the voltage and current density.

Having described my invention, what I claim is—

1. In the reduction of sulfid ores, the process of subjecting the ore to the action of an electric current flowing from an anode to a primary cathode in the presence of a quantity of the ore serving as a secondary cathode in an electrolyte capable of dissolving the metal constituent of said secondary cathode and forming a salt therewith, whereby said salt is decomposed and the metal deposited on the primary cathode, substantially as set forth.

2. In the reduction of sulfid ores, the process of subjecting the ore to the action of an electric current in an aqueous solution of an acid electrolyte capable of dissolving the metal constituent of the ore and forming a salt therewith, the current being passed from the anode to a primary cathode undecomposable by said current, whereby the ore serves as a secondary decomposable cathode from which the metal constituent enters into solution with the electrolyte and is subsequently deposited on the primary cathode, substantially as set forth.

3. In the reduction of sulfid ores, the process of subjecting a cathode of the ore to the action of an electric current in an electrolyte capable of dissolving the metal constituent of the ore and forming a soluble salt therewith, decomposing said salt, and depositing the said metal constituent on a suitable undecomposable cathode, substantially as set forth.

4. In the reduction of sulfid ores, the process of subjecting the ore to the action of an electric current flowing from an anode to an undecomposable cathode and to the ore in an aqueous solution of an acid electrolyte capable of dissolving the metal constituent of the ore and forming a salt therewith, decomposing said salt, and depositing said metal constituent on the undecomposable cathode, substantially as set forth.

5. In the reduction of metallic compounds, the process of subjecting the compound to the action of an electric current flowing from an anode to an undecomposable cathode and to the compound in an electrolyte capable of dissolving the metal constituent of the compound and forming a soluble salt therewith, whereby said salt is decomposed and the metal constituent deposited on the undecomposable cathode, substantially as set forth.

In testimony whereof I affix my signature in presence of two witnesses.

EDWARD L. ANDERSON.

Witnesses:
EMIL STAREK,
MARY D. WHITCOMB.